United States Patent
Addy et al.

(10) Patent No.: US 9,891,600 B2
(45) Date of Patent: Feb. 13, 2018

(54) UPGRADABLE HOME AWARENESS SYSTEM

(71) Applicant: Honeywell International Inc., Morristown, NJ (US)

(72) Inventors: Kenneth L. Addy, Massapequa, NY (US); Ronald K. Rothman, Smithtown, NY (US); Shylender N. Reddy, Syosset, NY (US); David S. Zakrewski, Babylon, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 227 days.

(21) Appl. No.: 13/792,626

(22) Filed: Mar. 11, 2013

(65) Prior Publication Data

US 2014/0253316 A1    Sep. 11, 2014

(51) Int. Cl.
*G08B 29/00* (2006.01)
*G05B 15/02* (2006.01)
*G06Q 10/06* (2012.01)

(52) U.S. Cl.
CPC ............ *G05B 15/02* (2013.01); *G06Q 10/06* (2013.01); *G05B 2219/2642* (2013.01)

(58) Field of Classification Search
CPC .................. G08B 25/14; G05B 15/02; G05B 2219/2642; G06Q 10/06
USPC ........................................................ 340/506
See application file for complete search history.

(56) References Cited

U.S. PATENT DOCUMENTS

| | | | | |
|---|---|---|---|---|
| 2002/0000092 A1* | 1/2002 | Sharood | ............... | F25D 29/00 62/127 |
| 2002/0103772 A1* | 8/2002 | Chattopadhyay | ...... | G06Q 10/10 705/412 |
| 2005/0096753 A1* | 5/2005 | Arling | .................... | G05B 15/02 700/11 |
| 2005/0241003 A1* | 10/2005 | Sweeney | ............ | G07C 9/00103 726/28 |
| 2006/0232399 A1 | 10/2006 | Martin | | |
| 2009/0066788 A1* | 3/2009 | Baum | ............... | G06F 17/30017 348/143 |
| 2012/0169461 A1* | 7/2012 | Dubois, Jr. | ........ | G07C 9/00309 340/5.61 |
| 2012/0260184 A1 | 10/2012 | Dawes et al. | | |

(Continued)

FOREIGN PATENT DOCUMENTS

| | | |
|---|---|---|
| DE | 20 2011 051 693 U1 | 3/2012 |
| WO | WO 01/52478 A2 | 7/2001 |
| WO | WO 2009/103827 A1 | 8/2009 |

OTHER PUBLICATIONS

Examination Report from corresponding GB application 1403952.3, dated Jul. 23, 2015.

(Continued)

*Primary Examiner* — Zhen Y Wu
(74) *Attorney, Agent, or Firm* — Husch Blackwell LLP

(57) ABSTRACT

A group of unsupervised detectors or control units in wireless communication with a user can be upgraded for the user with the addition of hardware and/or downloadable software to provide communications and information to a supervisory station. Supervisory station services can be implemented locally or via cloud based computer services. A displaced dealer can be contacted using codes carried by the detectors or the control units for installation or activation of additional services.

14 Claims, 2 Drawing Sheets

(56) References Cited

U.S. PATENT DOCUMENTS

| | | | | |
|---|---|---|---|---|
| 2013/0107131 A1* | 5/2013 | Barnett | ............... | G08C 17/02 348/734 |
| 2014/0176308 A1* | 6/2014 | Lee | ............... | G08C 17/02 340/12.5 |
| 2014/0223465 A1* | 8/2014 | Hatambeiki | ..... | H04N 21/44204 725/14 |

OTHER PUBLICATIONS

Examination Report from corresponding GB application 1403952.3, dated Sep. 8, 2014.
"My Home" app British gas, https://myhome.britishgas.co.uk/myhome, British Gas 2013.
DE 20 2011 051 693 U1, English-language summary, dated Mar. 8, 2012.
DE 20 2011 051 693 U1, English-language abstract, dated Mar. 8, 2012.

* cited by examiner

UPGRADABLE HOME AWARENESS SYSTEM

FIELD

The application pertains to systems and methods of upgrading an installed group of detectors intended to monitor various types of conditions in a region on an unsupervised basis to a supervised system. More particularly, the application pertains to such systems and methods that provide installable equipment or downloadable applications or files of executable software to add a supervisory capability to amalgamations of detectors that have been installed quite independently of one another.

BACKGROUND

There is increasing interest in the use of home awareness systems that allow home owners to remotely control activities within their homes. These systems can be controlled by a tablet computer or a smart phone to turn on lights, lock doors, set back a thermostat, etc. A drawback of these systems is that they do not support life-safety and security services via a professional supervisory station. There are instances where it would be an advantage to a home owner to initially perform a do-it-yourself installation of an awareness solution that might, in fact, be available as a B2C offering, but that would allow a subsequent upgrade to professional grade supervision without the need for wholesale replacement of existing equipment.

DETAILED DESCRIPTION

Figure 1:
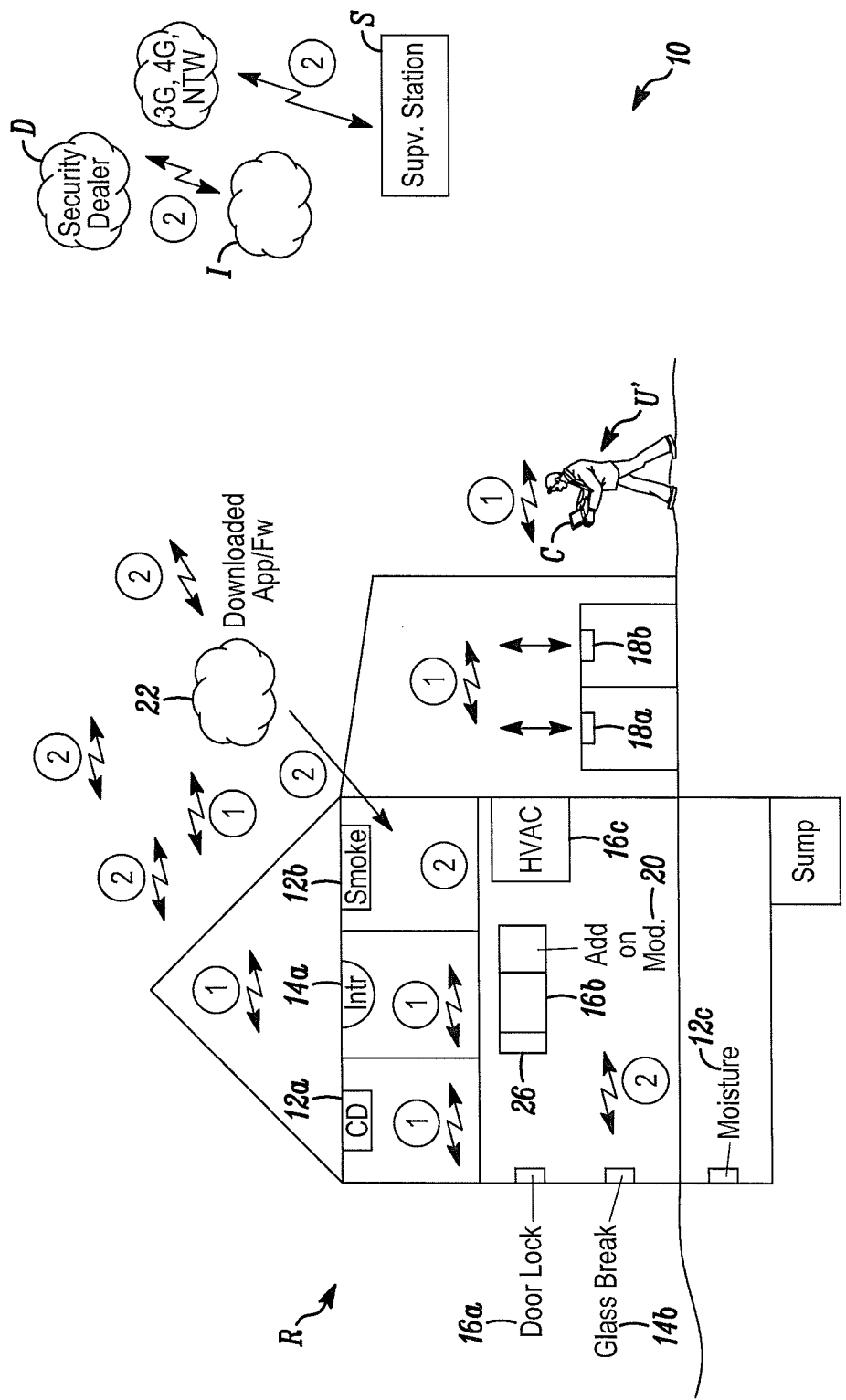
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiments illustrated.

In one aspect, as described below, embodiments hereof can implement system upgrades via one or more of a hardware upgrade, a local firmware/software upgrade, or a cloud service upgrade.

In one aspect, an additional hardware module can be added to an awareness solution, which might include a detector or a control unit. The module can, for example, upgrade communication reliability to a supervisory station and communicate via RF to detectors or control units previously installed in a home to upgrade their capabilities for professional operation. For example, a motion detector in an awareness solution may operate in an unsupervised way (i.e. low battery and tamper might not be monitored), but upon installation of the additional hardware module, a message can be sent to all sensors in a database to enable a supervisory capability. Alternately, a 4G communicator could be provided to add a redundant communication path to a (less reliable) Internet connection. This hardware module would be designed to connect directly to an awareness product, the detectors, or the control units without marring the aesthetics of either device.

This additional capability could be provided by enabling downloaded or pre-stored firmware to the awareness product or by downloading an application.

In an initial operational phase, a cloud service itself could initially offer limited connectivity for the awareness solution. Following the hardware or firmware/software upgrades in equipment in the home, a second operational phase could offer a different level of service with professional supervision.

In another aspect, a home owner buys, on line or in a store, a home awareness solution to monitor predetermined conditions or remotely control lights and a HVAC. In a cloud based configuration, the home owner registers the awareness product online for cloud services. The registrant's contact details can be shared with a local security system dealer. Alternately, a carton could include a readable code or a 1-800 number for the home owner to contact the local security system dealer.

The local security system dealer can automatically contact the home owner thereafter, offering additional products and services. Should the home owner decide to upgrade to higher service levels, the local security system dealer can enable new services via a cloud. Alternately, the local security system dealer can download additional firmware/software to devices in the home and, in some cases, may take additional hardware to the home to add new capabilities to the installed system.

FIG. 1 illustrates a multi-mode apparatus 10 wherein a residence R has been equipped with a home awareness-type system that includes a plurality of devices, such as ambient condition detectors, such as CO, smoke, or moisture detectors 12a, 12b, 12c, security monitoring detectors, such as intrusion detectors or glass break detectors 14a, 14b, or a plurality of control units, such as door locking units, lighting control units, or HVAC control units 16a, 16b, 16c. Garage door openers 18a, 18b can also be included.

The noted devices and control units in a first phase can be in wireless communication with a tablet computer, smart phone, or like device C operated by a user U who might reside in the residence R. In an initial phase of operation, the user U is able to communicate individually with the various devices via networks, such as the Internet or 3G or 4G communications networks, indicated by arrows numbered "1".

The multi-mode apparatus 10 can be upgraded to a second phase of operation by installing a hardware module 20, for example, at the lighting control unit 16b, or by downloading one or more applications, as at 22, to provide communications with and supervisory services from a displaced supervisory station S. In this mode, the various detectors or control units installed at the residence R can communicate with the hardware module 20 or via activated or downloaded software or applications 22. The hardware module 20 or the upgraded detectors or control units can, in turn, communicate via one or more networks with the supervisory station S, indicated by arrows numbered "2".

The various detectors or control units of the residence R might carry a code, such as a code 26 affixed to the lighting control unit 16b. The user U can read the code 26 via the device C that, in turn, can place the user U in communication with a security system dealer D who can provide additional services that can be downloaded as firmware 22 via the networks, the Internet I, or the 4G communications networks. As an alternate, the user U can contact the dealer D via a toll free phone number to set up additional services or features.

Figure 2:
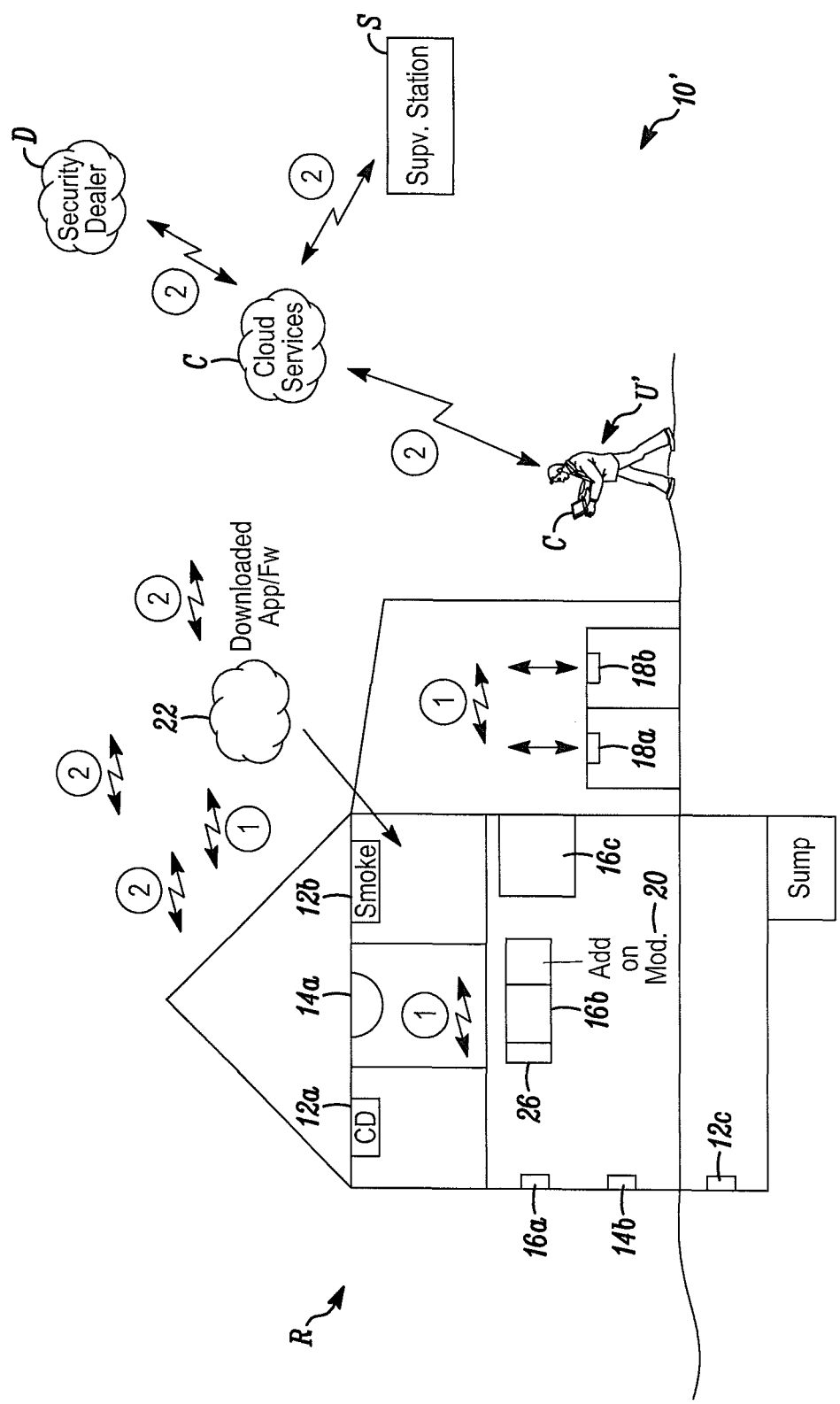
FIG. 2 illustrates a block diagram of another system in accordance herewith.

FIG. 2 illustrates an alternate configuration 10' wherein cloud services C can provide on-demand software services to support communications to/from the residence R and to enable the displaced supervisory station S to carry out a cloud based supervisory function. Among other features, the cloud services C can maintain a local data base of information as to all detectors or control units installed at the residence R for use by the displaced supervisory station S as well as usable in communications by the dealer D or with the detectors or the control units installed in the residence R and the user U.

In FIG. 2, the same identification numerals have been used to designate elements as discussed relative to FIG. 1. Where elements carry the same identification numerals as previously discussed relative to FIG. 1, those of skill will understand that no further discussion thereof is needed.

In summary, embodiments as disclosed herein provide hardware and/or software based solutions to enable a user to upgrade an unsupervised group of detectors and/or control units to a supervised status using either wireless networks and/or cloud computing services. A common supervisory controller and/or a dealer, can communicate with remote detectors or control units to enable new features and to process additional features from those remote detectors or control units.

Scenes could be enabled in an upgraded system. For example, in its original business-to-consumer state, a system might provide independent control of a remote wireless door lock. However, following a professional upgrade, the remote wireless door lock could be locked by a security system arming command. Then, the security system arming command could randomize internal lights of a residence to give an impression that an unoccupied/vacation home actually has occupants. The presented scene could be varied over time as an evening progresses to present a dynamic and more believable appearance.

Those of skill will understand that, while the above noted embodiments have been discussed in the context up an upgradable home control system, the teachings hereof apply equally to commercial buildings, without limitation.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An upgradable control system comprising:
   a plurality of wireless detectors that monitor or control conditions in a region, wherein the plurality of wireless detectors are adapted to function in a first phase to communicate with a smartphone or a tablet operated by a user associated with the region, and wherein the plurality of wireless detectors are unable to communicate with a displaced supervisory service station in the first phase; and
   hardware, downloadable software applications, or executable instructions that, when installed on or downloaded to one of the plurality of wireless detectors, upgrade the one of the plurality of wireless detectors by enabling the one of the plurality of wireless detectors to communicate with and receive life safety and security services from the displaced supervisory service station using the hardware or based on the downloadable software applications or the executable instructions,
   wherein the plurality of wireless detectors continue to communicate with the smartphone or the tablet in the second phase, and
   wherein, when the one of the plurality of wireless detectors has upgraded to the second phase, a plurality of visual or optical effects are created to create an impression of occupancy in the region by the user.

2. The upgradable control system as in claim 1 wherein at least some of the plurality of wireless detectors are upgradable along with the one of the plurality of wireless detectors.

3. The upgradable control system as in claim 2 wherein the one of the plurality of wireless detectors communicates via a cloud computing service with the displaced supervisory service station.

4. The upgradable control system as in claim 1 wherein the one of the plurality of wireless detectors communicates wirelessly with the displaced supervisory service station.

5. The upgradable control system as in claim 4 wherein the one of the plurality of wireless detectors communicates with the displaced supervisory service station via one or more wireless computer networks.

6. The upgradable control system as in claim 5 wherein the one or more wireless computer networks are selected from a class that includes a wireless local area network or 3G or 4G communications networks.

7. The upgradable control system as in claim 5 wherein the plurality of wireless detectors are selected from a class that includes ambient condition detectors, security monitoring detectors, environmental monitoring and control units, lighting monitoring and control units, door openers, and door locks.

8. The upgradable control system as in claim 1 further comprising at least one security related data base that includes information accessible by the displaced supervisory service station and that identifies a plurality of regions being supervised by the displaced supervisory service station.

9. The upgradable control system as in claim 8 wherein the at least one security related data base includes information pertaining to members of a class that includes ambient condition detectors, security monitoring detectors, environmental control units, lighting control units, door openers, and door locks.

10. A method comprising:
   providing a plurality of detectors selected from a class that includes at least ambient condition detectors, security monitoring detectors, environmental control units, lighting control units, door openers, and door locks;
   the plurality of detectors operating in a first phase by communicating with a wireless smartphone or a tablet operated by a user associated with a region, wherein the plurality of detectors are unable to communicate with a displaced supervisory service station in the first phase;
   installing hardware or downloading a software application or executable instructions on or to the plurality of detectors;
   the plurality of detectors operating in a second phase after installing the hardware or downloading the software application or the executable instructions on or to the plurality of detectors;

the plurality of detectors providing communication services with and receiving life safety and security services from the displaced supervisory service station using the hardware or based on the software application or the executable instructions while operating in the second phase;

the plurality of detectors continuing to communicate with the smartphone or the tablet while operating in the second phase; and while operating in the second phase, the lighting control units of the plurality of detectors creating a plurality of visual or optical effects to create an impression of occupancy in the region by the user.

11. The method as in claim 10 further comprising providing a cloud based computer service to communicate with the displaced supervisory service station.

12. A multi-mode control system comprising:

a plurality of installable detectors that, in a first phase, operate in an unsupervised mode and communicate with a smartphone or a tablet operated by a user associated with a region, wherein the plurality of installable detectors are unable to communicate with a displaced supervisory service station in the first phase; and circuitry associated with at least one of the plurality of installable detectors to upgrade the at least one of the plurality of installable detectors to a second phase, wherein the circuitry is implemented with one of an added hardware module or pre-loaded firmware that is remotely activated or downloadable executable instructions, wherein, in the second phase, the at least one of the plurality of installable detectors communicates with and receives life safety and security services from the displaced supervisory service station using the added hardware module, based on the pre-loaded firmware, or based on the downloadable executable instructions, wherein the at least one of the plurality of installable detectors continues to communicate with the smartphone or the tablet in the second phase, and wherein, when the at least one of the plurality of installable detectors has upgraded to the second phase, a plurality of visual or optical effects are created to create an impression of occupancy in the region by the user.

13. The multi-mode control system as in claim 12 wherein communications between the at least one of the plurality of installable detectors and the displaced supervisory service station are implemented via at least one wireless network.

14. The multi-mode control system as in claim 12 wherein the life safety and security services are implemented via at least one of a cloud based service or a wireless network in communication with the displaced supervisory service station.

* * * * *